Sept. 16, 1958  R. W. HOPSON  2,852,303
TRUCK BODY EXTENSION
Filed Nov. 29, 1955  2 Sheets-Sheet 1

INVENTOR.
Robert W. Hopson
BY *Victor J. Evans & Co.*
ATTORNEYS

Sept. 16, 1958          R. W. HOPSON          2,852,303
                     TRUCK BODY EXTENSION
Filed Nov. 29, 1955                      2 Sheets-Sheet 2
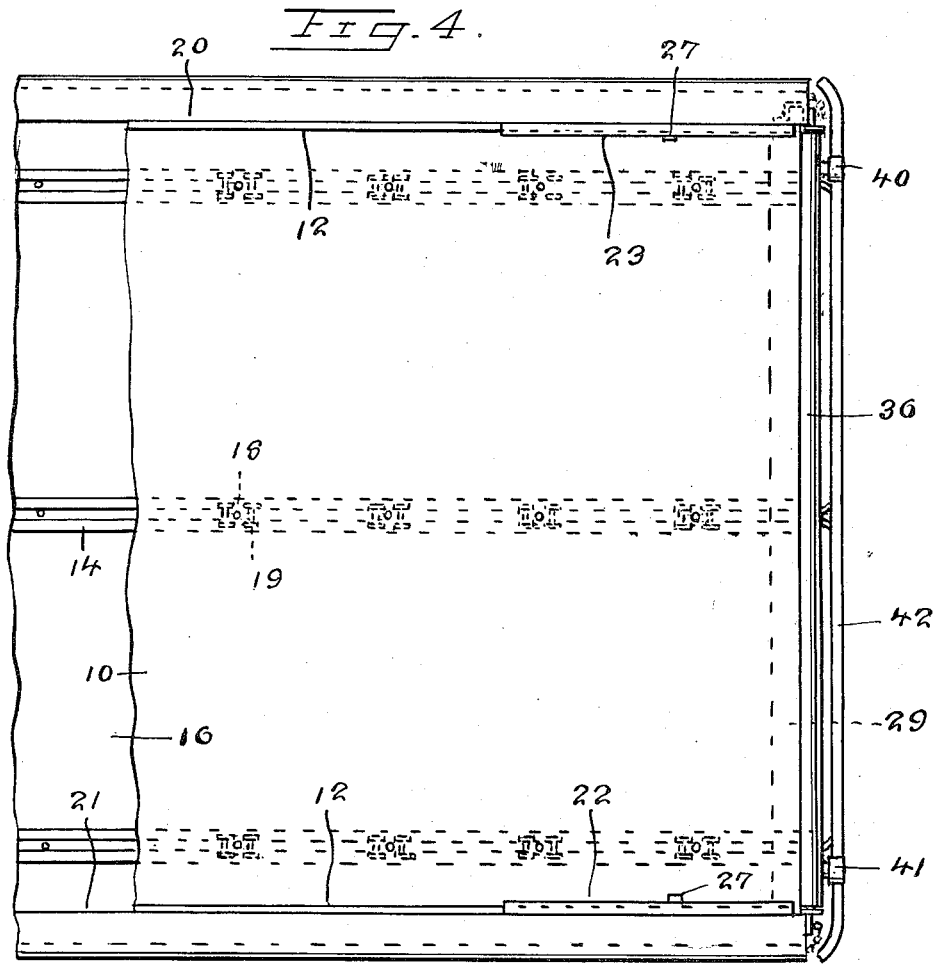
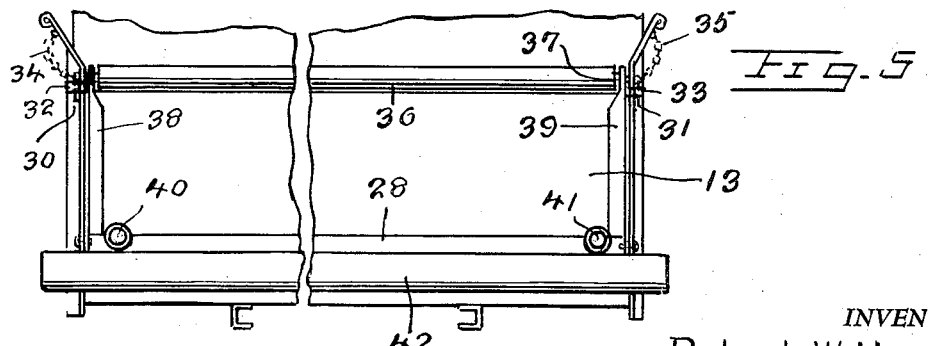
INVENTOR.
Robert W. Hopson,
BY Victor J. Evans & Co.
ATTORNEYS United States Patent Office 2,852,303
Patented Sept. 16, 1958

2,852,303
TRUCK BODY EXTENSION
Robert W. Hopson, Freeman, Va.
Application November 29, 1955, Serial No. 549,703
1 Claim. (Cl. 296—26)

This invention relates to small trucks, such as pick-up trucks wherein the length of the body is relatively short, and in particular a telescoping or sliding unit mounted in a conventional truck body and adapted to be drawn outwardly to an extended position to facilitate carrying a ladder, lumber, hay, pipe, and other products such as tobacco and also trees, and furniture.

The purpose of this invention is to extend the usefulness of a conventional pick-up truck by providing means for extending the length of the body to facilitate hauling elongated objects, products, or articles.

The conventional pick-up truck body is relatively short and although the devices may be extended from the rear end thereof it is difficult to support the extended portions of the devices and, particularly in hauling products such as hay and tobacco and also articles such as furniture it is difficult to provide supporting means for the extended portions thereof. With this thought in mind this invention contemplates a substantially U-shaped section slidably mounted in the truck body with rollers in tracks whereby the length of the body may be extended as desired.

The object of this invention is, therefore, to provide means for extending the length of a truck body which permits use of the truck body in the conventional manner.

Another object of the invention is to provide means for extending the length of a truck body in which the extension is adapted to be incorporated in truck bodies now in use.

A further object of the invention is to provide a telescoping section in a truck body in which the device is of a simple and economical construction.

With these and other objects and advantages in view the invention embodies a plurality of parallel longitudinally disposed tracks mounted on the floor of a truck body, a U-shaped element having a floor, side walls, and a tail gate slidably mounted in the tracks, and rails mounted on the sides of the truck body and positioned to extend over the edges of the side walls of the extension.

Other features and advantages of the invention will appear from the following description taken in connection with the drawings, wherein:

Figure 4 is a plan view of the rear portion of the truck body also showing the extension nested in the truck body.

Figure 5 is an end elevational view of the improved truck body showing a tailgate secured in the end of the telescoping extension.

Figure 3:
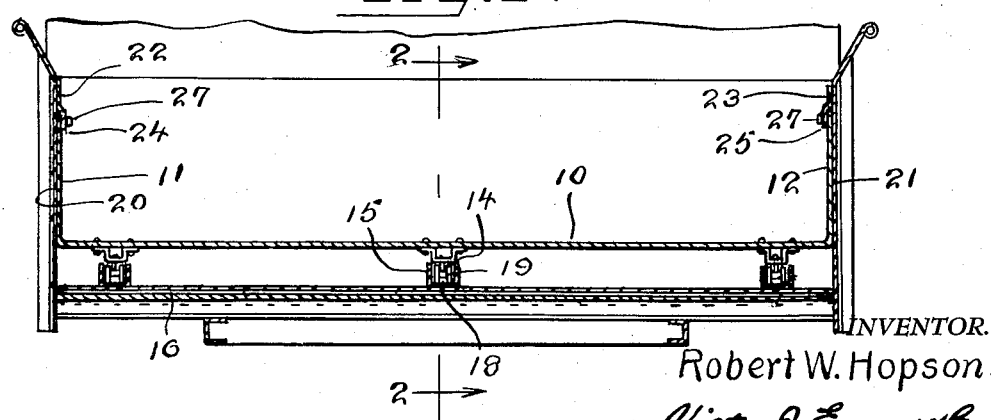
Figure 3 is a cross section through the rear portion of the truck body with the extension therein taken on line 3—3 of Fig. 2.

Referring now to the drawings wherein like reference characters denote corresponding parts the improved truck body extension of this invention includes an inner body substantially U-shaped in cross section having a bottom 10 with side walls 11 and 12 and a tail gate 13 and, as illustrated in Fig. 3 the extension is slidably mounted in tracks with channel-shaped rails or members 14 mounted on the under surface of the bottom 10 positioned in registering relation with channel-shaped tracks 15 mounted on the platform or floor 16 of the truck body with transversely disposed bars 17 positioned at the ends of the tracks and secured to the tracks and also to the platform of the truck body.

The channels 14 on the under surface of the bottom 10 of the extension are provided with spaced trucks 18, each having four wheels 19 rotatably mounted thereon, the wheels being positioned with two in each side of the track or channel.

The upper edges of the side walls 11 and 12 are retained in position against side walls 20 and 21 of the truck body with rails or brackets 22 and 23, the lower edges 24 and 25 of which extend downwardly, overlapping upper edges of the side walls 11 and 12, as illustrated in Fig. 3. The upper edges of the side walls 11 and 12 are provided with openings 26 that are positioned to receive bolts 27 extended through lower edges of the rails 22 and 23, as shown in Fig. 2.

Figure 2:
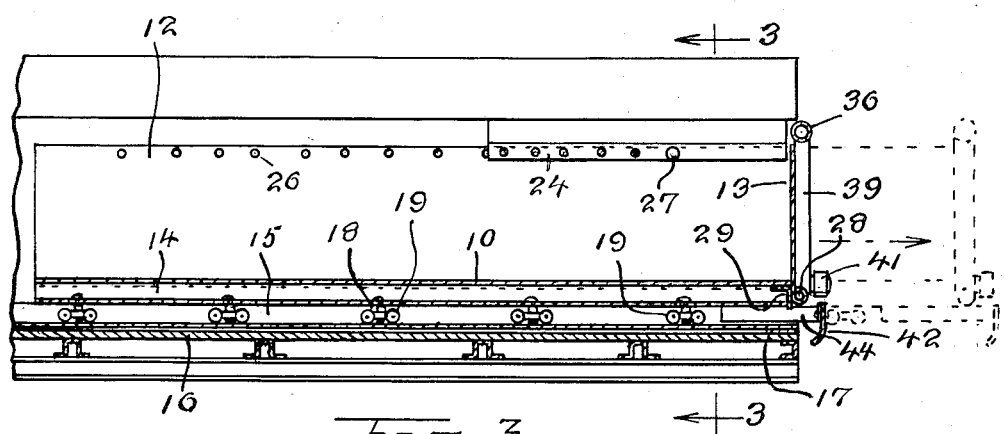
Figure 2 is a longitudinal section through the body of the truck shown in Fig. 1 with the parts shown on an enlarged scale and with the telescoping section or extension shown in full lines nested in the truck body and in an extended position in broken lines, said section being taken on line 2—2 of Fig. 3.

The tail gate 13 is secured by a continuous hinge 28 to a transversely disposed angle bar 29 secured to the lower surface of the bottom 10, as shown in Fig. 2 and the tail gate is retained in an upwardly extended or closed position with pins 30 and 31 which extend through eyes 32 and 33, respectively, on the ends of the tail gate, the pins being retained in position with chains 34 and 35 as shown in Fig. 5.

A roller 36 is rotatably mounted on a shaft 37 in the upper end of the tail gate, also as shown in Fig. 5, the roller being in position to facilitate inserting long objects, such as ladders, pipe and the like in the extension or truck body and also to facilitate removing such objects from the body. The edges of the tail gate are reinforced with tubular members 38 and 39.

The tail gate of the extension is also provided with tail lights 40 and 41 and a bumper 42.

Figure 1:
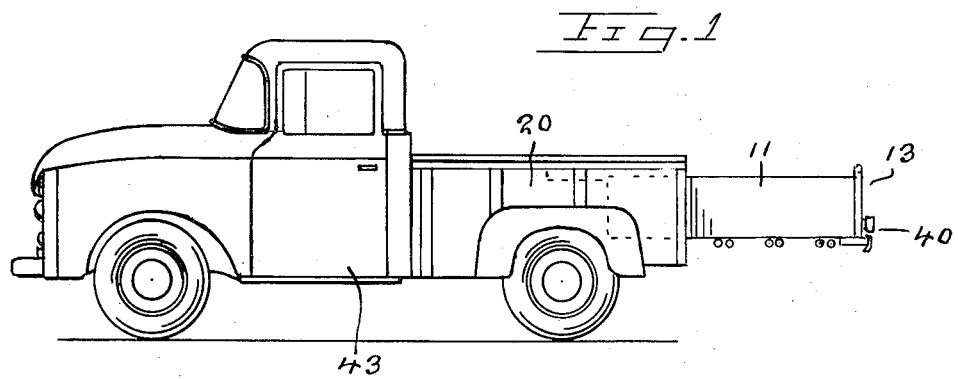
Figure 1 is a side elevational view showing a typical pick-up truck with a telescoping section in an extended position.

With the truck body extension assembled and installed as illustrated and described the truck, which is indicated by the numeral 43 may be used with the extension nested in the body of the truck, as shown in Fig. 2 or with the extension extended, as illustrated in Fig. 1 and with the device extended a boat, lumber, pipe, and other objects or devices may readily be carried in the truck body and the parts may be inserted and removed as desired.

It will be noted in Fig. 2 that the tail light and bumper travel with the extension or telescoping section and the bumper is secured to the structural members of the extension with bars 44 or by other suitable means.

The telescoping section may also be mounted in a truck body by other means and suitable means may be provided for limiting outward movement of the extension or section. The parts may also be made of suitable material.

Thus, it will be seen that there has been provided an arrangement wherein there is provided a support member that includes a horizontally disposed floor 16 and there is further provided the vertically disposed spaced parallel side members which extend upwardly from the floor 16. The numeral 17 indicates horizontally disposed bars which are mounted on the floor 16, and there is provided a plurality of spaced parallel horizontally disposed channel shaped tracks 15 which are mounted on the bars 17 and which are arranged at right angles to these bars.

A movable U-shaped body member is adjustably connected to the support member, and the body member includes a horizontally disposed bottom wall 10 and spaced parallel vertically disposed side walls 11 and 12. The numerals 14 indicate channel shaped rails which are secured to the lower surface of the bottom wall, and these rails register with the tracks. The numeral 18 indicates trucks which are connected to the rails, and these trucks include wheels 19 which engage the tracks. Brackets 22 and 23 are secured to the inner surface of the side members and these brackets include offset portions which engage the upper edges of the side walls.

There is further provided a plurality of spaced apart openings 26 in the upper portions of the side walls, and securing elements 27 extend through the brackets for selectively engaging the openings 26. The numeral 29 indicates an angle bar secured to the bottom wall of the body member, and a tailgate 13 is hingedly connected to this angle bar. The numeral 37 indicates a shaft which is mounted in the upper portion of the tailgate, and a roller 36 is rotatably mounted on this shaft, there being tail lights and a bumper 42 connected to the movable body member.

It will be understood that other modifications, within the scope of the appended claim, may be made in the design and arrangement of the parts without departing from the spirit of the invention.

What is claimed is:

In a vehicle, a support member including a horizontally disposed floor and vertically disposed spaced parallel side members, horizontally disposed bars mounted on said floor, a plurality of spaced parallel horizontally disposed channel shaped tracks mounted on said bars and arranged at right angles to said bars, a movable U-shaped body member adjustably connected to said support member, said body member including a horizontally disposed bottom wall and spaced parallel vertically disposed side walls, channel shaped rails secured to the lower surface of said bottom wall, said rails registering with said tracks, trucks connected to said rails and said trucks including wheels engaging said tracks, brackets secured to the inner surfaces of said side members, said brackets including offset portions engaging the upper edges of said side walls, there being a plurality of spaced apart openings in the upper portions of the side walls, securing elements extending through said brackets for selectively engaging said openings, an angle bar secured to the bottom wall of said body member, a tailgate hingedly connected to said angle bar, a shaft mounted in the upper portion of the tailgate, a roller rotatably mounted on said shaft, and tail lights and a bumper connected to said movable body member.

References Cited in the file of this patent

UNITED STATES PATENTS

| 1,467,195 | Quackenbush | Sept. 4, 1923 |
| 1,730,480 | Shirreff | Oct. 8, 1929 |
| 2,094,401 | Girl | Sept. 28, 1937 |
| 2,284,419 | Greig | May 26, 1942 |

FOREIGN PATENTS

| 807,761 | Germany | July 2, 1951 |
| 197,756 | Switzerland | May 15, 1938 |